United States Patent Office 2,951,797
Patented Sept. 6, 1960

2,951,797
PHOTOSENSITIZERS IN PHOTOXIDATION

Dexter B. Sharp, Vandalia, Ohio, assignor to Monsanto Chemical Company, St. Louis, Mo., a corporation of Delaware No Drawing. Filed Nov. 13, 1957, Ser. No. 696,066

6 Claims. (Cl. 204—158)

The present invention is directed to photoxidation processes utilizing tetrabenzo mono- and diaza porphyrins as photoxidation catalysts. The invention is further directed to the photoxidation of olefins employing tetrabenzo mono- and diaza porphyrins as photoxidation catalysts.

The porphyrins, of course, are the class of compounds in which four pyrrole nuclei are linked together in a circular pattern by four carbon atoms so that a great ring containing 16 atoms is formed; in the present catalysts, 1 or 2 of the four carbon atoms are replaced by nitrogen. While the formulae herein depict the unsaturated porphyrin ring system in conventional manner, it will be recognized that the double-bonds are capable of shifting to various resonance states and that the photosensitizing use of the catalysts described herein is contemplated by the present invention, regardless of what the actual predominant resonance state may be.

The compounds suitable for use in the present invention can be represented by the general formula:

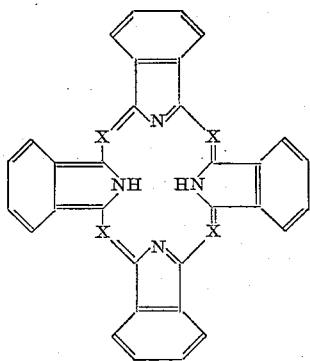

in which each X is selected from the group consisting of nitrogen and CH, but only from 1 to 2 X's are nitrogen. The position of the X's in the compound can be designated as the meso positions, or as the α, β, γ and δ positions. The benzo-groups in the tetrabenzomono- and diazaporphyrin catalysts and in the above formula can contain various substituents, as exemplified, for example, by chlorobenzo, dichlorobenzo, methylbenzo, N,N-dimethylaminobenzo, hydroxybenzo, 1,2-naphtho, 2,3-naphtho, etc., or any other benzo groups. In addition, the benzo groups in these photosensitizing catalysts can have any or a combination of such substituents as alkyl groups, e.g., methyl, ethyl, propyl, isopropyl, butyl, isobutyl, secondary butyl, tertiary butyl, n-amyl, isoamyl, tertiary amyl, n-hexyl, decyl, dodecyl, etc.; alkoxy substitutents, e.g., methoxy, ethoxy, isopropoxy, butoxy, hexyloxy, etc.; halogen substituents, e.g., bromine, chlorine, fluorine, and iodine; and any other substituents which do not change the fundamental aromatic character of the groups.

Phthalocyanines have some photosensitizing activity in photoxidation procedures. However, the photosensitizing activity of the tetrabenzomono- and diaza porphyrins in photoxidation procedures is several times greater than that of the phthalocyanines. In addition, the tetrabenzomono- and diaza porphyrins have much greater solubility in organic substrates, and thus can be more readily used in oxidizing such substrates.

It will be understood that the use of the metal chelate forms of the above structure is also included in the present invention. Such metals as, for example, zinc, magnesium, copper, iron, nickel, cobalt, lead, etc., can readily be chelated with porphyrins, and the resulting chelates are effective as photosensitizers. The chelates can be represented by the above porphyrin structure, with the following bonding between the metal and the pyrrole nitrogens:

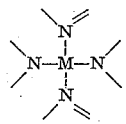

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

It is an object of the present invention to improve the efficiency and yields in photoxidation reactions by the use of superior photosensitizing catalysts. It is a further object to render photoxidation procedures more practical and economical by the use of photosensitizers of improved stability. It is a further object to employ photosensitizers having good solubility in organic substrates. It is a further object to utilize superior photosensitizers which can be prepared by procedures of organic synthesis.

The terms "photoxidizing," "photoxidation," "photosensitized," etc., as used herein in the specification and claims are intended to cover true photosensitized oxidation reactions in which light in the presence of a photosensitizing catalyst causes the oxidation; the terms are not intended to include autoxidations, or oxidations proceeding by a free radical mechanism in which irradiation with light serves to initiate free radicals. The true photosensitized oxidation reactions are characterized by the fact that the rate of the reaction is proportional to the intensity of irradiation at both high and low intensities, and the fact that ordinary oxidation inhibitors do not retard the reaction.

The photoxidation reaction of the present invention can be postulated according to the following equations:

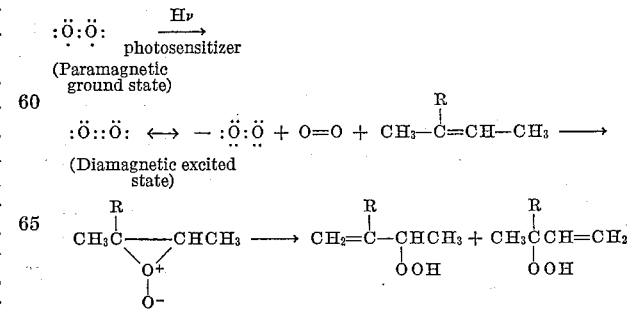

In these reactions a photosensitizer must be present to catalyze the conversion of the molecular oxygen in the ground state to an activated polarizable state. Light is also necesary to effect this reaction. The irradiating light can vary considerably in wave length, wave lengths in the visible regions being preferred. The light can be monochromatic or polychromatic. Light of wave lengths in the range of about 3600 to about 8000 angstroms has been found very suitable. While light in the ultraviolet region, particularly the near ultraviolet region, can be used as it is effective to some extent in causing photoxidation, it is desirable to avoid use of light in these regions as it tends to catalyze autoxidations and other free-radical type reactions. High-energy ultraviolet may also cause accelerated catalyst photo-decomposition. The speed of the photoxidation reaction is proportional to the intensity of the irradiation; this relationship is very important, as it makes it possible to obtain reaction rates suitable for commercial production by merely providing high power light sources.

The amount of tetrabenzomono- or diazaporphyrin photosensitizer can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular tetrabenzomono- or diazaporphyrin photosensitizers. Examples of a few suitable solvents are aromatic hydrocarbons, such as benzene, toluene, etc.; acylic and cyclic alkanes, for example, n-hexane and cyclohexane; amines, for example, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, from below 0° to 100° C. or higher can be used; if desired the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se.

The photoxidation process of the present invention can be applied to any photoxidizable substrates; the inventive feature of the process is essentially the discovery of the superior photosensitizing activity of the catalysts described herein, and this photosensitizing activity is valuable in the photoxidation of any substrates. Representative substrates are, for example, such open chain (aliphatic) and cyclic mono-olefins as 1-heptene, 1-octene, 1-dodecene, 1-hexadecene, diisobutylene, cyclopentene, 1-methyl-1-cyclopentene, cyclohexene, 1-methylcyclohexene, 1,2-dimethylcyclohexene, cyclooctene, α-pinene, dipentene, limonene, carvomenthene, terpinolene, propylene trimers, tetramers, pentamers, etc., all of which are photoxidized to hydroperoxides, presumably by means of an allylic shift as represented by:

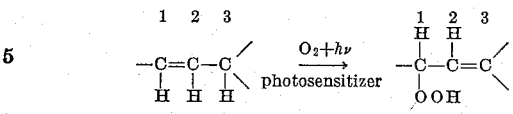

The hydroperoxide products can readily be reduced to alcohols, or used in other ways as organic intermediates for the production of useful compounds. The photoxidation process of the present invention converts cyclic conjugated dienes to endocyclic peroxides, and open chain conjugated dienes to exocyclic peroxides; representative of dienes which are so converted are, for example, cyclopentadiene, 1,3-cyclohexadiene, 2-methyl-1,3-cyclohexadiene, α-terpinene, α-phellandrene, α-pyronene, β-pyronene, 1,3-hexadiene, 1,3-dimethylbutadiene, 2,3-dimethylbutadiene, alloocimene, etc. Other substrates which can be photoxidized in the process of the present invention are, for example, amines; thioureas, e.g., thiourea; dienes of the sterol series, e.g., ergosterol; heterocyclic olefins, e.g., furans; triolefins; olefinic acids, e.g., oleic acid; fulvenes, e.g., phenylfulvene; aldehydes; phenylhydrazones; semicarbazones, thiosemicarbazones, enol ethers, sulfinic acids, etc.; such groups as ester, amide, urethans, n-acetyl, phenyl, hydroxyl, Cl, Br, etc., even if adjacent to the oxidizable group in the foregoing types of substrates, do not ordinarily interfere in the photoxidation reaction. It will be appreciated, of course, that the foregoing substrates will vary in their ease of photoxidation, photoxidation rates, etc., and in the products resulting from photoxidation; such variations, however, do not affect the photosensitizing activity of the tetrabenzomono- and diazaporphyrin catalysts in the photoxidation reactions. It is evident from the foregoing, however, that the present process concerns introducing oxygen into the molecule of the organic compound without destruction thereof, i.e., actual addition of the oxygen to the compound, as a result of subjecting the organic compound capable of adding oxygen under the influence of light and a photosensitizing catalyst to simultaneous light irradiation and contact with oxygen and a tetrabenzomono- or diazaporphyrin.

The propylene polymers referred to above are unsaturated olefins obtained by polymerization of propylene. In particular, propylene trimer used as the substrate, several examples below, was obtained by acid-catalyzed homoaddition of propylene to itself. The general method involves passage of propylene at superatmospheric pressure over a phosphoric acid-impregnated solid support at temperatures greater than 100° C., collecting the polymerized hydrocarbon and fractionating to isolate the trimer, tetramer, pentamer, etc., fractions. The trimer utilized herein was obtained from Enjay Company and has a boiling range of 260–290° F., and sp. gr. 20/20 of 0.736–0.740. A minimum of 100 p.p.m. t-butylcatechol is added as oxidation inhibitor. In early photoxidation runs, this was removed by adsorption, but the photoxidation proceeds equally as well in its presence or absence. The propylene pentamer used also was obtained from Enjay and has the following properties: Enjay "Pentadecene," sample No. 19–E–1, B.P. 249–268° C., API gravity of 60° F., 41.7. Propylene tetramer used was Enjay "Tetrapropylene" and has B.P. 350–445° F., sp. gr. 20/20 of 0.768–0.781.

The following examples illustrate certain embodiments of the invention, but the invention is not to be considered as limited thereto.

EXAMPLE 1

A conventional 20-unit Precision Scientific Warburg apparatus was provided with a double-circle, 5000-volt "standard cool white" fluorescent light especially fabricated to fit the apparatus. The light was immersed in the constant-temperature bath to provide uniform illumination of the Warburg vessels from below. Separate solutions were made up containing 1-mg. amounts of copper phthalocyanine and tetrabenzodiazaporphin, respectively, in 10 ml. chloronaphthalene. Individual Warburg vessels were then charged with 9.5 ml. of one of the chloronaphthalene catalyst solutions and 0.5 ml. propylene trimer. The oxygen uptake of the solutions was then measured in the Warburg apparatus in order to determine the photosensitizing activity of the tetrabenzodiazaporphyrin, compared to that of phthalocyanine:

*Oxygen absorbed in microliters*

| Catalyst | Time in Minutes | | | | |
|---|---|---|---|---|---|
| | 15 | 30 | 45 | 60 | 75 (Dark) |
| Tetrabenzodiazaporphin | 90 | 189 | 288 | 393 | 399 |
| Phthalocyanine | 26 | 57 | 86 | 118 | 118 |

It is clear from the above data that the photosensitizing activity of tetrabenzodiazaporphyrin is several times greater than that of phthalocyanine. The oxygen uptake under identical conditions of a solution containing hemim, after correcting for the absorption in the absence of light, was 69 microliters in one hour.

EXAMPLE 2

Solutions of tetrabenzomonoazaporphin and copper tetrabenzodiazaporphin in chloronaphthalene and propylene trimer were prepared according to the procedure of Example 1. Photoxidation of the solutions at 25° C. in the Warburg gave the following results:

*Oxygen absorbed in microliters*

| Catalyst | Time in Minutes | | | | |
|---|---|---|---|---|---|
| | 15 | 30 | 45 | 60 | 75 (Dark) |
| Tetrabenzomonoazaporphin | 106 | 187 | 245 | 292 | 298 |
| Copper Tetrabenzodiazaporphin | 88 | 187 | 290 | 395 | 406 |

The following examples illustrate procedures which can be used in preparing the tetrabenzomono- and diazaporphyrin catalysts for use in the photoxidation procedures of the present invention. In general, the tetrabenzomono- and diazaporphyrins are prepared by heating o-chloroacetophenones with cuprous cyanide, or by condensation of o-acetylbenzonitriles with o-phthalonitriles. The reaction of very small amounts of the phthalonitriles with large amounts of the benzonitriles will produce tetrabenzo monoazaporphyrins, while larger amounts of the phthalonitriles will produce the tetrabenzo diazaporphyrins. Various derivatives can be obtained by simply employing substituted o-acetylbenzonitriles or substituted o-phthalonitriles in the preparation of the porphyrins. When mixtures of the monoaza and diaza-compounds are obtained, they can be separated by chromatographic or other procedures. Some examples of tetrabenzomono- and diazaporphyrins other than those in the examples above, which can be used as photosensitizing catalysts in the process of the present invention are tetrakis(3,4-dichlorobenzo)diazaporphyrin, tetrakis($\alpha,\beta$-naphtho)diazaporphyrin, tetrakis(2,3-naphtho)-diazaporphyrin, bis($\alpha,\beta$-naphtho)dibenzodiazaporphyrin, dibenzo-bis(4-hydroxybenzo)monoazaporphyrin, etc. It will be understood, of course, that the tetrabenzomono- and diazaporphyrins can be utilized in the photoxidation process of the present invention regardless of their method of preparation. For example, if such porphyrins are prepared by reactions of mixtures of benzopyrroles (isoindoles), phthalonitriles and aldehydes, they can still be employed in the process of the present invention.

EXAMPLE 3

The following procedure can be utilized to prepare tetrabenzomonoazaporphin for use as a photoxidation catalyst (Helberger, Ann. 529, 305 (1937)). To a glass reactor equipped with stirrer and condenser were charged 6 grams o-chloroacetophenone, 0.4 gram recrystallized CuCN, and 20 ml. quinoline. The mixture was heated with stirring and introduction of nitrogen gas by means of an oil bath maintained at 210 to 220° C. for 6 hours. The warm mixture was diluted by addition of 20 ml. pyridine and the solid product was collected by filtration. Part of the dark blue-purple copper complex of tetrabenzomonoazaporphin was recrystallized from boiling $\alpha$-chloronaphthalene, successively washed with $\alpha$-chloronaphthalene, alcohol and ether. About 0.22 gram of the crude copper complex was converted to the free base by treatment with concentrated sulfuric acid followed by dilute alkali (with cooling); the solids were filtered from the solution, washed with water, recrystallized from $\alpha$-chloronaphthalene, washed successively with $\alpha$-chloronaphthalene, alcohol and ether to give 0.2 gram of tetrabenzomonoazaporphin. Spectral analysis indicated that the free base differed in structure from the copper complex.

EXAMPLE 4

The following procedure can be utilized to prepare tetrabenzodiazaporphin (Helberger, Ann. 531, 279 (1937)). To a 200-ml. test tube was charged 0.4 gram o-cyanoacetophenone, 0.2 gram phthalonitrile, 0.2 gram cuprous chloride and 3 ml. freshly distilled quinoline. The mixture was heated in an oil bath at 210 to 220° C. for five hours. The mixture was diluted with about 10 ml. pyridine and allowed to stand overnight. The solids were collected by filtration and washed successively with pyridine, alcohol, and ether to give about 0.4 gram of copper complex of tetrabenzodiazaporphin as purple crystals.

Further discussion of the preparation of porphyrins appears in my copending application Serial Number 696,063, filed of even date herewith. The photoxidation processes of the present invention can be applied to the photoxidation of any of the substrates utilized in the processes of the aforesaid copending application. In addition, the catalysts of the present invention can be utilized in various chelate forms in the manner illustrated by the activity of the chelate forms of the catalysts in the aforesaid copending application. The utility of the present catalysts is further demonstrated by their applicability in the preparation of isoprene as disclosed in the copending application of John R. Le Blanc and myself, Serial Number 696,062, filed of even date herewith.

What is claimed is:

1. A process for introducing oxygen into an organic compound which comprises simultaneously subjecting an organic compound capable of adding oxygen under the influence of light and a photosensitizing catalyst to light irradiation and contact with oxygen and a porphyrin catalyst selected from the class consisting of tetrabenzomonoaza- and tetrabenzodiazaporphyrins, thereby introducing oxygen into the molecule of the said organic compound without destruction thereof.

2. A process for introducing oxygen into an organic compound which comprises simultaneously subjecting an organic compound capable of adding oxygen under the influence of light and a photosensitizing catalyst to light irradiation and contact with oxygen and a porphyrin, thereby introducing oxygen into the molecule of the said organic compound without destruction thereof, the said porphyrin having the structure:

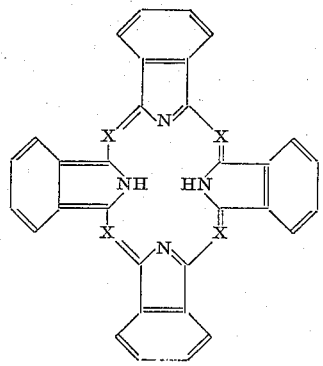

in which each X is selected from the group consisting of nitrogen and CH, but only from 1 to 2 X's are nitrogen.

3. The process of claim 1 in which the organic compound is irradiated with light of wave length in the range of about 3600 to 8000 Angstroms.

4. The process of claim 3 in which an aliphatic olefin is converted to an aliphatic peroxide.

5. The process of claim 3 in which an aliphatic monoolefin is converted to an aliphatic hydroperoxide.

6. A process of photoxidizing propylene trimer to its hydroperoxide which comprises irradiating olefin comprising propylene trimer with light from a source of at least 1000 watts and of wave length of 3600 to 8000 Angstroms and contacting the said olefin with oxygen and tetrabenzodiazaporphin, thereby introducing oxygen to form the said hydroperoxide.

References Cited in the file of this patent

UNITED STATES PATENTS

| | | |
|---|---|---|
| 2,165,130 | Coe | July 4, 1939 |
| 2,732,337 | Togel | Jan. 24, 1956 |